United States Patent
Perlman (10) Patent No.: US 10,948,387 B1
(45) Date of Patent: Mar. 16, 2021

(54) AIRBORNE PARTICLE COLLECTION DEVICE AND METHOD

(71) Applicant: Perlman Consulting, LLC, Arlington, MA (US)

(72) Inventor: Daniel Perlman, Arlington, MA (US)

(73) Assignee: Perlman Consulting, LLC, Arlington, MA (US)

( * ) Notice: Subject to any disclaimer, the term of this patent is extended or adjusted under 35 U.S.C. 154(b) by 0 days.

(21) Appl. No.: 16/578,310

(22) Filed: Sep. 21, 2019

(51) Int. Cl.
| G01N 1/22 | (2006.01) |
| G01N 1/30 | (2006.01) |
| C09J 7/20 | (2018.01) |
| C09J 7/38 | (2018.01) |

(52) U.S. Cl.
CPC .............. *G01N 1/2202* (2013.01); *C09J 7/20* (2018.01); *C09J 7/385* (2018.01); *G01N 1/30* (2013.01); *C09J 2433/00* (2013.01)

(58) Field of Classification Search
CPC ................................ G01N 1/2202; C09J 7/385
See application file for complete search history.

(56) References Cited

U.S. PATENT DOCUMENTS

| 5,693,895 | A | 12/1997 | Baxter |
| 7,205,145 | B2 | 4/2007 | Ryan |
| 9,933,351 | B2 | 4/2018 | Kent et al. |
| 2006/0105395 | A1* | 5/2006 | Pempsell ........... G01N 15/1475 435/7.1 |
| 2006/0148028 | A1* | 7/2006 | Noda ........................ C12Q 1/04 435/34 |
| 2010/0238447 | A1* | 9/2010 | Hirsch ................ G01N 21/8483 356/437 |
| 2016/0326401 | A1* | 11/2016 | Ikebata .................... C09J 7/385 |

OTHER PUBLICATIONS

Razmovshi et al. "Adhesive tapes as capturing surfaces in Burkhard sampling" (Grana 37: 305-310, 1998).
Hirst, J.M., "An Automatic Volumetric Spore Trap", Annals of Applied Biology, 39:257-265, 1952.
Alcazar, P., Comtois, P. A new adhesive for airborne pollen sampling. Aerobiologia 15, 105-108 (1999). https://doi.org/10.1023/A:1007505517863.
3M Optically Clear Adhesives 8211 8212 8213 8214 8215 multimedia. 3m.com/mws/media/530755O/3mtm-optically-clear-adhesives-8211-8212-8213-8214-8215.pdf.
Air-O-Cell cassette brochure made by Zefon Intl. Inc. (Ocala, FL; www.zefon.com/Content/Products/SamplingMedia/aocug.pdf_ 2009.

* cited by examiner

*Primary Examiner* — Matthew D Krcha
(74) *Attorney, Agent, or Firm* — Verrill Dana, LLP (57) ABSTRACT

An improved forced air sampling cassette is provided for the capture, identification, quantification, and analysis of airborne particles such as mold spores, plant pollens, dust, and other airborne pollutants. An adhesive assembly for the cassette is also provided. The cassette makes use of a pressure-sensitive adhesive layer with substantially improved properties for quantitative capture of airborne particles up to about 300 microns in size or larger.

25 Claims, 5 Drawing Sheets

AIRBORNE PARTICLE COLLECTION DEVICE AND METHOD

BACKGROUND

For reasons of personal and public health, regular monitoring of the quantity and identity of both natural and man-made airborne particles present in outdoor and indoor air is important. Particles that may be regarded as pollutants and require monitoring include allergenic plant pollens, mold spores, and both organic and inorganic dusts and fibers, for example. Razmovshi et al., in an article entitled "Adhesive tapes as capturing surfaces in Burkhard sampling" (Grana 37: 305-310, 1998), pointed out that monitoring devices for pollutants have employed sticky surfaces such as adhesive tapes and coatings containing glycerin. Such devices are used to capture, sample, and measure the amount of pollen in the atmosphere. Hirst measured the spore content of air using microscope slides coated with petroleum jelly in an automatic volumetric spore trap (Hirst, J. M., Annals of Applied Biology, 39:257-265, 1952). The so-called Hirst-Burkard 7-day spore trap employs an adhesive containing petroleum jelly partially hardened with paraffin; this adhesive was commonly used for collecting and monitoring spores, despite its limitations due to temperature and humidity sensitivity and variable film thickness, which result in variable spore capture and retention efficiency.

In exploring alternative adhesives, Razmovshi et al. tested a variety of adhesive tapes containing different water-based and solvent-based pressure-sensitive adhesives for capturing airborne particles. These investigators described air flow sampling through a Hirst-Burkard spore trap in which air propelled by suction was maintained at a controlled rate of 8-10 liters/min to limit "particle bounce" on the adhesive tapes. Such devices are often referred to as forced air sampling cassettes (FASCs). For microscopic analysis of spores and other particles, adhesive tapes have been affixed to microscope slides using double-sided semi-transparent sticky tape (adhesive applied to both sides of a thermoplastic carrier film). Results indicated that particles smaller than about 40 microns were captured on adhesive tape more easily than larger particles such as pollen grains.

Alcazar et al. (Aerobiologia 15:105-108, 1999) used a double-sided self-adhesive acrylic tape (Scotch 3M 9425) for collecting airborne particles in a Hirst-Burkard spore trap. The clear acrylic tape contained a polyvinyl chloride carrier coated on each side with acrylic adhesive having a thickness of approximately 2 mils (0.002 inch, or about 50 microns). This method was reported to have 20% greater capture efficiency than a glycerin coating. In U.S. Pat. No. 9,933,351, Kent, et al., describe a personal airborne particle monitoring device utilizing a 3M Company polyester film tape (No. 850) to capture and collect airborne particles. The tape contained a 1 mil thick (0.001 inch, about 25 microns) acrylic adhesive coating that is functional over a wide temperature range. Other compact cassette collection devices are described in U.S. Pat. No. 5,693,895 by Baxter and U.S. Pat. No. 7,205,145 by Ryan which allow pollutant particles in a rapidly propelled air stream to impact a tacky surface and be retained on that surface. Besides adhesive tapes, other tacky surfaces including grease coatings, hydrocolloids, and nutrients have been used to trap and preserve particles of biological origin in a living state.

Several problems exist in the in the use of FASC devices for capturing and identifying airborne pollutants. These problems include the following:

Inconsistent particle capture. Sticky, viscous gel-like materials used in FASCs often have properties that change over time and alter particle capturing efficiencies. Viscous gel-like materials including vaseline, glycerin, hydrocolloid gels, and aqueous components are thickly coated to facilitate capture of large particles, and are often applied in small window patterns or panels on an optically flat and transparent surface such as a glass microscope slide or a glass coverslip. However, the surface of such materials may undego physical and/or chemical changes over time that alter the efficiency of capture of certain particles, depending on particle surface morphology or size.

Limited shelf life. Viscous gel-like capture materials are awkward to handle and are generally perishable, such as hydrogels subject to drying and chemical breakdown, or materials containing perishable nutrients, which limits the shelf life of the capture material and the overall FASC device to one year or less. The shelf life is not substantially extended by adding sealing membranes or removable closures over the air inlet and air outflow ports present in the FASC device.

Failure to capture large particles. The use of pressure-sensitive adhesive tapes such as 3M 850 and 9425 has been largely unpopular because these adhesives have failed to efficiently capture larger pollutant particles such as approximately 100 micron diameter and larger fungal spores. This can lead to underestimation in counting of large spores such as fungal spores.

Therefore, there remains a need for airborne particle traps that more efficiently and consistently trap particles, especially larger particles of about 100 microns or more, and that have a longer shelf life.

SUMMARY

The present technology provides a forced air sampling cassette (FASC) as well as an adhesive assembly therefor having improved properties for capture of airborne particles such as mold spores, plant pollens, dust, and pollutants. The FASC makes use of a pressure-sensitive adhesive film with substantially improved properties for quantitative capture of airborne particles up to about 300 microns in size.

One aspect of the present technology is an adhesive assembly for an FASC. The term "adhesive assembly" herein refers to the combination of a pressure-sensitive adhesive (also referred to herein as an "adhesive coating") bonded to an optically transparent and rigid substrate, such as a glass or plastic optical microscope slide or coverslip. Pressure-sensitive adhesives used in the present technology are preferably acrylic-based viscoelastic adhesives that are used to form unconventionally thick adhesive coatings (greater than 75 microns thick and preferably 100-150 microns or greater) and that also have a low elastic storage modulus. As used herein, the term "unconventionally thick" refers to an adhesive coating whose thickness is substantially greater than the 25-50 micron thick adhesive coatings typically used in pressure-sensitive packaging tapes, adhesive tapes and general attachment or fastening tapes. Also, as used herein, the term "pressure-sensitive adhesive" refers to an adhesive whose degree of bonding is influenced by the amount of pressure applied to the adhesive. No solvent, water, heat or other agent is needed to activate the acrylic adhesives used in the present technology. The adhesive used in the present FASC maintains an optically flat surface geometry upon application to an optically flat substrate such as a microscope glass coverslip. Functionally defined, given an "optically flat surface", an analytical laboratory worker microscopically identifying and/or counting pollutant particles has little or no need for constant refocusing of the microscope's optics during scanning and taxonomic identification of spores and other pollutant particles at 100× to 400× magnification, for example.

Another aspect of the present technology is a method for rapidly and conveniently producing a plurality of adhesive assemblies for use in FASC devices. Each adhesive assembly includes an adhesive coating bonded to a transparent optical microscopy surface such as a glass coverslip. An adhesive coating is conveniently handled in the form of a flexible paper or plastic strip or ribbon sandwich containing therein an essentially optically flat adhesive coating or film. Preferably, the adhesive coating is provided in the form of an adhesive film that is chemically homogeneous and physically continuous throughout its thickness, and that is sandwiched between two protective release films (also referred to herein as "release liners"), which may be, for example, siliconized paper or siliconized plastic films. In order to produce a plurality of adhesive assemblies, the sandwiched adhesive ribbon is optionally cut into strips whose width corresponds to the width of the transparent substrate or portion thereof to be covered by the adhesive coating. A first release liner is removed from the adhesive coating of the ribbon, exposing the adhesive surface, which is bonded to the surfaces of a plurality of transparent substrates to form a plurality of adhesive assemblies. In order to mount an adhesive assembly inside an FASC device, the second release liner is removed, exposing the other surface of the adhesive film (also referred to herein as the "capture surface").

Yet another aspect of the present technology is a mounting jig for positioning several (e.g., 5 or more, or 10 or more) transparent substrates surfaces during assembly of a plurality of adhesive assemblies by the method described above.

DETAILED DESCRIPTION

The present technology provides an improved forced air sampling cassette (FASC) for the capture and analysis of airborne particles as well as an adhesive assembly for the cassette. Particles including mold spores, plant pollens, dust, and other airborne particulate pollutants can be captured, quantified, and identified or studied using the improved FASC and methods of use presented herein. The improvement is brought about through the use of a layer of transparent, optically flat, pressure-sensitive adhesive material disposed on a transparent substrate with substantially improved properties for quantitative capture of airborne particles up to about 300 microns in size or larger, which were not captured or not captured quantitatively using previous technologies.

Forced Air Sampling Cassette Devices Currently, a frequently used device for capturing and identifying airborne pollutant particles such as pollens, fungal spores, and dusts is a small forced air sampling cassette (FASC) such as the Air-O-Cell® cassette made by Zefon Intl. Inc. (Ocala, Fla.; www.zefon.com/Content/Products/SamplingMedia/aocug.pdf). The Air-O-Cell® device is described in U.S. Pat. No. 5,693,895 (incorporated herein by reference in its entirety). This FASC device was used for testing and evaluating a variety of capturing surfaces for airborne particles. This and similar devices operate by rapidly pumping indoor or outdoor air through a cassette having an air inlet and air outflow port. The high velocity airstream containing airborne particles is directed against a transparent gel-like substance that captures airborne particles, allowing subsequent analysis of adhered particles by light microscopy. Depending upon air velocity, particle size and particle concentration in the air being sampled, these devices typically capture a variety of pollutant particles that are $\geq 2$ microns in diameter. The air flow through the cassette is controlled to a rate of approximately 5-15 liters per minute (lpm) over an exposure interval ranging from 0.5-10 minutes. These air flow rates produce high air velocities of 25 to 50 mph across the capture surface. However, large airborne pollutant particles, such as fungal spores of $\geq 100$ microns or even $\geq 150$ microns diameter, are inefficiently captured by this commercially available system. Therefore, alternative adhesive coatings were sought that could yield higher capture efficiency for large airborne particles in an FASC.

Figure 1A:
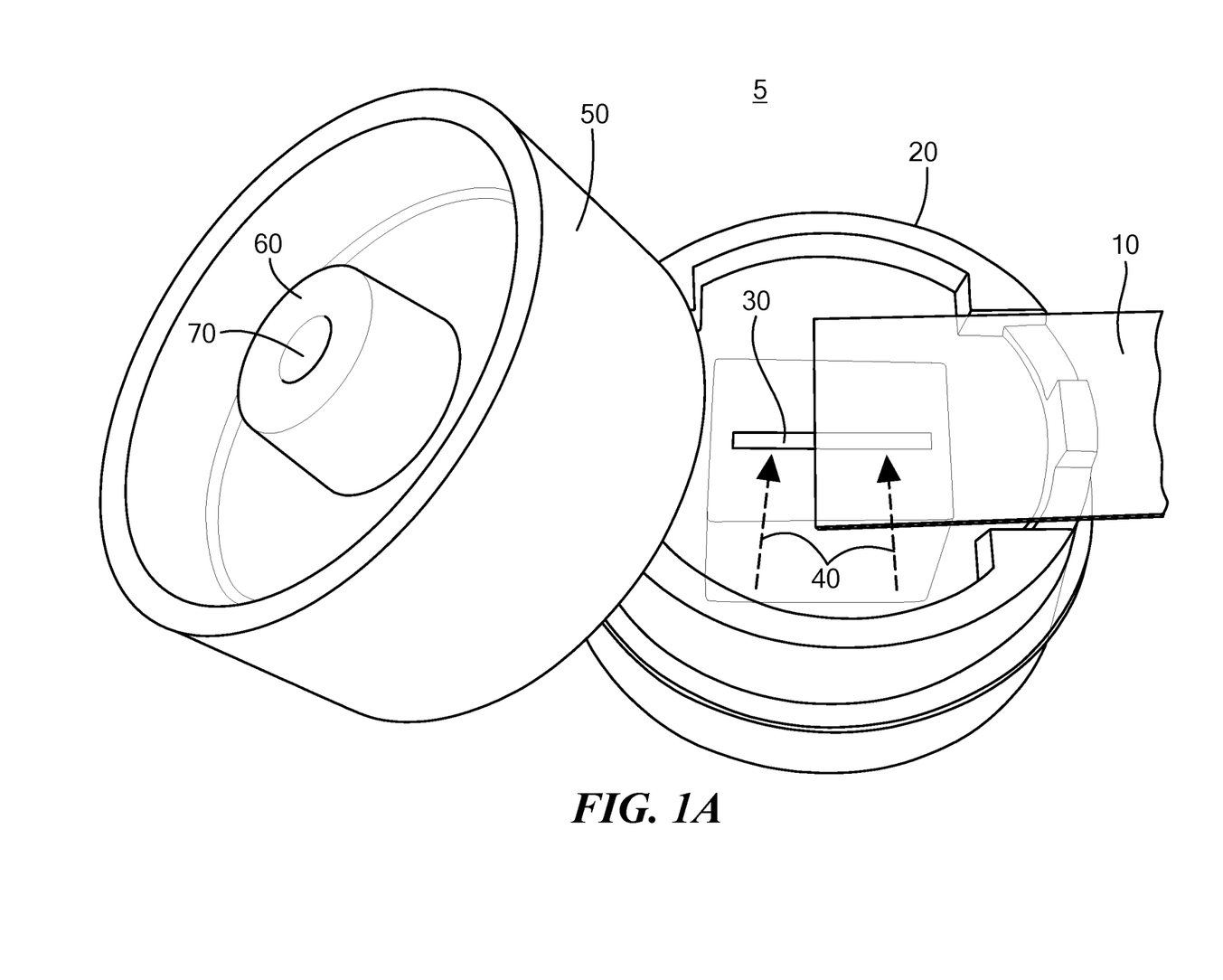
FIG. 1A shows a disassembled FASC manufactured by Zefon International (Ocala, Fla.). The cassette includes an adhesive-coated glass coverslip to be mounted inside the cassette during assembly.
Figure 1B:
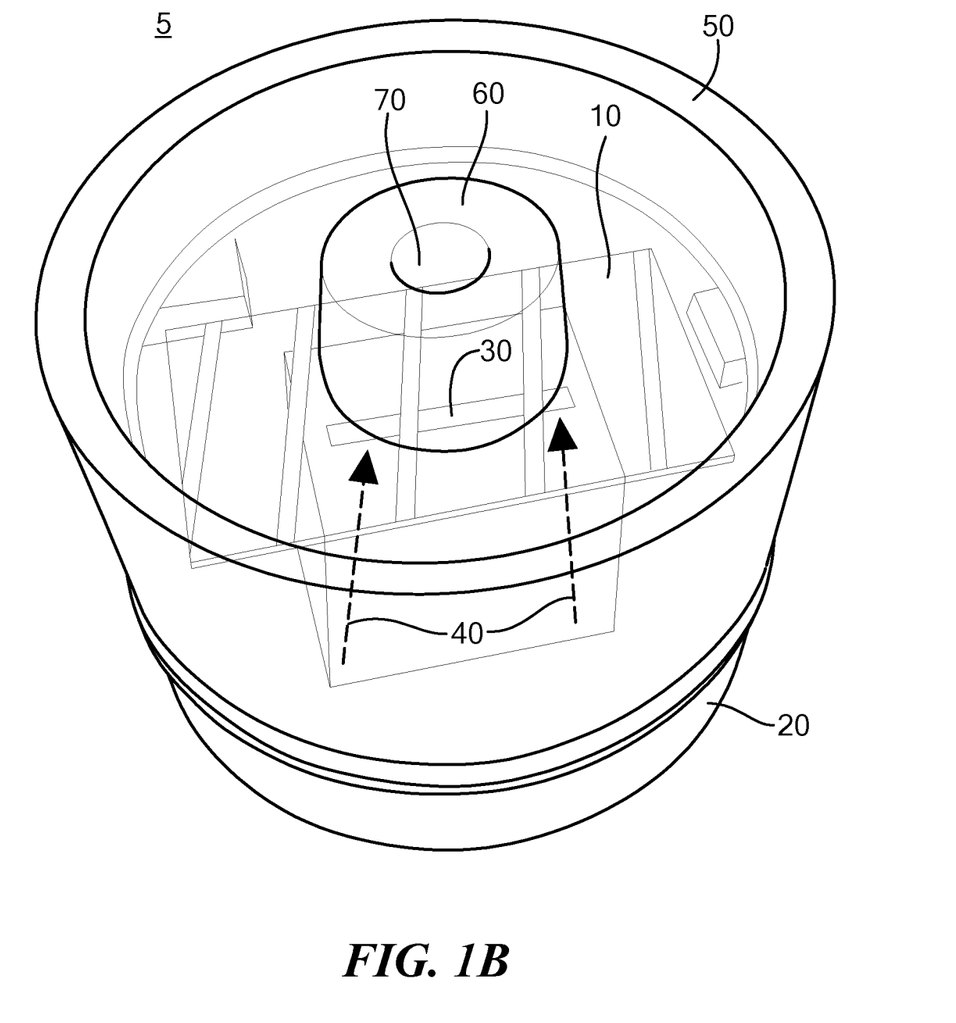
FIG. 1B shows the assembled configuration of the FASC shown in FIG. 1A.

An embodiment of an FASC is depicted in FIGS. 1A, 1B, 2A, and 2B. FIG. 1A shows adhesive cassette 5 having upper portion 50 removably attached to lower portion 20. Adhesive assembly 10 is positioned between the upper and lower portions, with the adhesive facing air inlet slit 30. Air enters the lower portion of the cassette through pathways 40. Air exits the FASC through opening 70 in outlet port 60, which is connected to a vacuum pump in use.

Until now, the use and/or acceptance of pressure-sensitive adhesive surfaces by professionals has been limited and questioned largely because these adhesives do not efficiently capture large airborne pollutant particles such as 100-300 micron diameter mold spores. This failure leads to underestimating the presence of certain large pollutant particles such as fungal spores. Consequently by default, the use of less convenient and more perishable viscous gel-like materials for capturing airborne pollutant particles has persisted. However, the present technology takes into account that pressure-sensitive adhesives inefficiently capture large, e.g., 100-300 micron, airborne pollutant particles. Contrary to expectation, selecting an adhesive coating with increased stickiness (e.g., quantified by the "adhesive peel strength" to glass) did not lead to increased capture of large airborne particles. However, the present inventor unexpectedly discovered that large airborne spore particles could be captured with higher efficiency using an acrylic adhesive coating selected based on altering two different physical properties of the coating and providing: (1) a lower "elastic storage modulus" of the adhesive material, and (2) a substantially greater coating thickness, preferably in the range of about 3 mils (75 microns) to 6 mils (150 microns) or greater.

"Storage modulus" or "elastic storage modulus" is a measure of the elastic response of a material, and refers to the amount of energy stored by the material when it is deformed or stretched. The storage modulus is a viscoelastic property of a material and can be used to characterize pressure-sensitive adhesives and other polymeric materials, such as hydrogels and polymer coatings. Storage modulus is a measure of a material's deformation energy (i.e., the higher the storage modulus, the higher the deformation energy), and it can relate to the degree of cross-linking of a polymeric material. The storage modulus can be quantified in Pascal (abbreviated Pa) units of pressure where 1 Pa=1 newton per square meter and 101,300 Pa 14.5 psi or a pressure of approximately 1 atmosphere. The adhesive film of the present technology preferably has a storage modulus of less than 300,000 Pascals at 20° C. and more preferably between 50,000 Pascals and 150,000 Pascals at 20° C. In the present technology, it is advantageous for the adhesive film to have a low storage modulus that allows deformation and capture of adherent airborne particles which impact with relatively low energy. Adhesive films having a storage modulus greater than 150,000 Pascals such as in the range between approximately 151,000 Pascals and 300,000 Pascals or more at room temperature (20° C.) require too much energy to deform and thereby quantitatively capture impacting airborne particles in an FASC. The storage modulus of a pressure-sensitive adhesive material can be measured, for example, using oscillation rheology. More specifically, the storage modulus can be measured by using a dynamic mechanical analysis (DMA) instrument that applies, for example, sinusoidal oscillatory shear between parallel plates to the adhesive material. A suitable DMA instrument is the Discovery HR-3 from TA Instruments, New Castle, Del. For measurement equipment, methods and calculations of storage modulus see, for example: en.wikipedia.org/wiki/Dynamic_mechanical_analysis.

An acrylic adhesive for use in an adhesive coating of the present technology is formed into an unconventionally thick coating compared to the adhesive coating of conventional fastening tapes, which do not usually exceed about 2 mils (50 microns). The 2 mil adhesive coating limit on fastening tapes follows from the fact that the sought-after adhesive peel strength for acrylic coatings does not substantially increase if the coating thickness is increased beyond approximately 2 mils. For example, see 3M Company's 821X acrylic adhesive, whose adhesive peel strength (20 min. dwell at room temp. on glass) remains substantially unchanged as the coating thickness is increased beyond 2 mils (multimedia.3m.com/mws/media/5307550/3mtm-optically-clear-adhesives-8211-8212-8213-8214-8215.pdf). Notwithstanding this fact, for the purposes of the present technology, the adhesive coating is substantially increased in thickness over prior coatings used in an FASC device to a level preferably greater than 3 mils, and more preferably at least 4 mils, at least 5 mils, or at least 6 mils. This results in a soft and thick acrylic adhesive coating that remains transparent and optically clear by using optically clear adhesives (OCAs). Such adhesives are not used in fastening tapes, but find use in lamination of large, rigid, transparent layers such as those used in forming electronic touch screens and liquid crystal display screens.

Preferred adhesives are OCAs that are homogeneous acrylic adhesive coatings. By the term "homogeneous" and/or "physically continuous" is meant that the acrylic adhesive coating is uninterrupted in any of its dimensions (thickness, width, length), and free of any interrupting material such as the polymer structural/carrier film present in double-sided mounting tape (e.g., 3M 9425). By comparison, with a physically continuous and homogeneous adhesive coating, the full thickness of the adhesive coating is physically accessible to impacting particles and is available for capturing large as well as small diameter airborne particles. For example, large particles measuring at least 50 microns, at least 100 microns, at least 150 microns, at least 200 microns, at least 250 microns, or even 300 microns or larger in diameter can be captured in a homogeneous adhesive coating. As evidenced below, the efficiency of particle capture is further enhanced in unconventionally thick adhesive coatings by selecting an acrylic adhesive having a low elastic storage modulus, such as a storage modulus at room temperature (20° C.) of substantially less than 300,000 Pascals, less than 250,000 Pascals, less than 200,000 Pascals, less than 150,000 Pascals, preferably less than 125,000 Pascals, or even more preferably less than 100,000 Pascals. Measured storage modulus numbers for the 3M Company's optically clear CEF28XX acrylic adhesive used herein have been kindly provided to Applicant by the 3M Company (3M Display Materials & Systems Division, 3M Center, St. Paul, Minn.). In its original "uncured" form (i.e., not cross-linked by UV light) the CEF28XX adhesive has a storage modulus at 20° C. of approximately 93,840 Pascals. For reference, the storage modulus at 0° C. for the same adhesive is significantly much greater (approximately 304,500 Pascals) and is significantly much lower at 40° C. (approximately 43,500 Pascals) because the adhesive becomes harder at lower temperature and softer at higher temperature. After UV-cross-linking, the storage modulus for the same CEF28XX adhesive is only slightly altered (approximately 92,800 Pascals at 20° C., approximately 298,000 Pascals at 0° C., and approximately 43,500 Pascals at 40° C.

Preferred features of the adhesive material for the adhesive coating are as follows: The adhesive should be compliant enough to allow particles to become embedded in the coating when impacting the coating in an FASC device. The adhesive coating (also termed the "adhesive film") should be transparent, meaning that the coating or film is optically clear, i.e., without any visible haze, and essentially free of visible particulate contaminants when viewed under a microscope at 150× or even 400× magnification such as the so-called "OCA" (Optically Clear Adhesive) and "CEF" (Contrast Enhancement Film) products manufactured by the 3M Company. The adhesive coating should be of constant thickness and optically flat over the intended scanning path, preferably 1 cm length or more. The coating is preferably what is described as "thick" or "extra thick" for commercial applications; it preferably has a thickness greater than 2 mils, such as at least 3.0 mils, at least 4 mils, at least 5 mils, at least 6 mils, or 6 mils to 8 mils, or 5 mils to 10 mils, or 5 mils to 15 mils. A maximum practical and useful range for the adhesive coating or film is considered to be between approximately 3 mils and 10 mils (75 microns and 250 microns). Without intending to limit the present technology to any particular mechanism, it is believed that suitable adhesive coatings are both soft and thick enough, e.g., about 0.006 inch or 150 microns, to allow both small and large airborne particles to be captured in the adhesive rather than bounce away. For example, pollens and spores can range from about 2 microns to over 100 microns in size. Thus, a spore of 100 microns diameter may require an adhesive coating that is at least of comparable or greater thickness, such as approximately 100-150 microns (0.004-0.006 inch).

In addition, the thickness of the acrylic adhesive coating is uniform over its surface (i.e., over its width and length) and the adhesive film is provided without a carrier film embedded within or supporting the homogeneous adhesive coating. However, for ease of application, the adhesive material is preferably provided with removable release films attached to and protecting both of its flat surfaces. Typically, the adhesive film is provided with a first release liner which peels more easily compared to the second release liner, which is removed just prior to inserting the adhesive assembly into an FASC device. The adhesive assembly including the adhesive film (aka, the "adhesive coating") and the transparent optical microscopy surface (aka, the "transparent substrate") preferably has a shelf life of at least 2 years when contained within a FASC device whose air inlet and air outflow ports are hermetically sealed (airtight) with closures that are removed at the time of use.

Preferred adhesives for the adhesive coating are optically clear adhesives (OCAs) such as acrylic polymer adhesives. Especially preferred are OCAs from the 3M Company's OCA class known as "contrast enhancement films" (CEFs), which are very effective in capturing airborne spores and other pollutants and allowing their microscopic identification. Especially preferred are 3M adhesives of the CEF28XX series, also known as 8148-X series adhesives. Another useful adhesive type is the 3M 821X series (e.g., the 8215 product having a 5 mil thick adhesive film). All of the above OCA products are manufactured by the 3M Display Materials and Systems Division of the 3M Company (St. Paul, Minn. 55144) as precise thickness-controlled homogeneous adhesive coatings that are free of any intervening structural carrier film. These OCA films are manufactured and commercially provided as the acrylic adhesive film sandwiched between two exterior peelable release liners and are essentially homogeneous and physically continuous because they are free of any internal carrier or structural film that would interrupt the continuity of the adhesive across its thickness.

In commerce, OCA acrylic adhesive coatings are currently used for laminating and optical bonding of transparent LCD flat panel displays, transparent graphic overlays, liquid crystal modules and touch screen panels, all requiring an optically clear bond, but have not been previously used for capturing and identifying pollutant particles. OCA acrylic coatings are structurally and functionally distinguished from conventional acrylic adhesive tapes used previously in FASC devices for capturing and monitoring air pollutant particles. Not only do OCA coatings have superior optical clarity and a single refractive index across its full thickness, but suitable OCA coatings also have a reduced elastic modulus and structural homogeneity, resulting in part from the coating being free of any internal plastic carrier film. The refractive index of the preferred OCA adhesive is approximately 1.48-1.49 over the visible wavelength range (400 nm to 650 nm) and therefore matches that of glass quite well (1.51-1.52 at 630 nm). This refractive index matching is desired, given that the adhesive is often applied to a transparent optical microscopy surface that may later be placed onto a glass microscope slide for optical analysis. Such refractive index matching is not obtained by using double-sided adhesive tapes, because those tapes include an imbedded carrier film.

As shown in Table 1, the experiment described in Example 1 revealed that a 6 mil thick coating of a soft, low storage modulus acrylic adhesive such as 3M 8148X is capable of capturing over five times more large fungal spores than a 1 mil thick coating of the identical 8148X adhesive. Conventional adhesive fastening tapes having an adhesive coating of 1-2 mils captured only ⅕-⅙ of the spore particles captured on the Zefon commercial gel-type material. However, the 6 mil adhesive of the present technology, e.g., 3M 8148-6 (aka, 3M CEF2806) also outperformed the Zefon gel and captured even greater numbers of airborne particles. Furthermore, to facilitate microscopic identification of particles such as fungal spores on thick coatings, it is beneficial to take advantage of the high degree of microscopic optical clarity found in OCA acrylic coatings.

Commercially available OCAs were compared with respect to their particle-trapping abilities when used in an FASC. In particular, the 3M CEF28XX (also known as 8148-X) series and the 821X series of adhesives were tested. The adhesive strength (180 degree peel adhesion) reported by the manufacturer was almost identical for a given thickness and width of adhesive. For example, for 2.0 mil thick adhesive coatings, the peel adhesion (or force required to peel the coatings from glass after 20 min dwell at 25° C.) was consistent at approximately 7.1 Newtons per cm width of adhesive for both the CEF2802 (8148-2) and the 8212 OCA adhesive products. Surprisingly, when the dynamic elastic properties, including resistance to stretch pressure, were compared for these two adhesives, large differences were noted. For example, over the temperature ranges commonly encountered in air quality testing, e.g., from 0° C. to 40° C., the storage modulus and loss modulus values for the 8148-X adhesive were less than about one-half of the values for the 821X adhesive. For example, at 20° C. the storage modulus (G') for the 8148-X adhesive was approximately 94,000 Pa compared to 211,000 Pa for the 821X adhesive. The loss modulus (G") differences were even greater (approximately 62,000 Pa for the 8148-X adhesive compared to 206,000 Pa for 821X. Still greater differences were seen at lower temperatures (e.g., in the 0° C. to 10° C. temperature range), where the storage modulus at 0° C. for the 8148-X adhesive was 304,500 Pa versus 1,555,000 Pa for the 821X adhesive.

The 8148-X and 821X adhesives were tested using an air particle pollution testing laboratory, and the results showed substantially greater recovery numbers of pollutant particles in general for the 8148-X series of adhesives than for the harder 821X series adhesives (see Table 1 and Example 1). The results also showed that, for the 8148-X adhesives, the 6 mil thickness (8148-6) captured a substantially greater number and diversity of large spore particles than the corresponding 1 and 2 mil (8148-1 and 8148-2) adhesive coatings of the same adhesive material. Therefore, both the storage modulus and the film thickness are important factors in maximizing airborne particle capture, and good adhesive strength alone does not ensure the desired capture result.

FASC devices typically are designed to use replaceable adhesive assemblies that hold the adhesive coating in position with its capture surface exposed to the flow of air through the device. The adhesive assembly is configured and sized to be positioned in fixed position within the FASC.

The acrylic coatings described above can be used in any FASC device designed for capturing and identifying airborne particles. The particles are suspended in a rapidly propelled stream of air or gas, which is typically propelled at a rate of 5-20 liters per minute, but other rates also can be used. The air or gas can be of any source for which the capture, counting, and/or identification of suspended particles is desired, such as outdoor air, indoor air, or an artificially produced gas. The gas can also be a carrier gas used to sweep up particles from a surface or container. The gas and/or the particles further can be of extraterrestrial origin, such as an atmospheric gas or dust from an extraterrestrial planet of the solar system or from an exoplanet. Particles also can be harvested without the use of a carrier gas, such as by exposing the adhesive coating to an environment or to the vacuum of space. The adhesive coating of the present technology is useful for reproducibly sampling and capturing airborne particles under widely varying environmental conditions, such as relative humidity varying from about 5% to about 99% and temperature varying from about −40° C. to +95° C.

EXAMPLES

Example 1. Comparison of Adhesives for Use in Forced Air Sampling Cassettes

The performance of four optically clear acrylic adhesives in collecting and identifying fungal spores and pollen was compared. A proprietary gel-like adhesive material used by Zefon International also was tested.

A total of 80 modified spore straps were prepared for the study using recycled Zefon International Air-O-Cell™ spore traps whose glass coverslips had originally carried the Zefon gel-like spore capturing coating. Those coverslips were replaced by new glass coverslips (measuring 17.5 mm×31.0 mm×0.4 mm thick) modified by addition of optically clear soft acrylic laminating adhesives of various thicknesses (1.0-6.0 mils). Twenty spore traps were prepared for each of four commercially available 3M acrylic OCA coatings of differing thicknesses including adhesive 8212 (2 mils), 8214 (4 mils), 8148-1 (1 mil) and 8148-6 (6 mils). As controls, 10 of the unmodified Zefon commercial Air-O-Cell™ brand spore trap cassettes were used containing the standard Zefon gel-like capturing coating to evaluate the efficacy of the new acrylic OCA adhesives. Each spore trap was exposed to outdoor ambient air propelled using an air pump set to a flow rate of 15 lpm for a period of 10 minutes. All samples were taken sequentially on the same day. Once the samples were collected, the spore traps were prepared and analyzed by standard methods using light microscopy. The spore counting results consist of the total number of spores captured on individual adhesive-coated glass coverslips held in individual cassettes, together with the top three spore varieties identified.

The taxonomic identification consists of the number of total genera vs. the number of similar genera/groups of spores and the percentage of similarity of all genera/groups of spores in the sample. The top three genera types and the size range of the spores were reported. The means of the 20 samples were used to compare the efficacy of the four adhesive types.

Adhesive 8212 (2 mils thick) captured an average of 7 spores including 4 spore types. Adhesive 8214 (4 mils thick) captured an average of 10 spores including 6 spore types. Adhesive 8148-1 (1 mil thick) captured an average of 8 spores including 5 spore types. Adhesive 8148-6 (6 mils thick) captured an average of 54 spores including 15 different spore types. The Zefon control captured an average of 46 spores including 8 different spore types. Laboratory analysis was used for counting and identifying all captured spores and other airborne particles found on all adhesive surfaces (Pro-Lab, Inc., Weston, Fla.). In the case of the 3M 8148-6 mil adhesive, the following 15 varieties/genera of hyphal and fungal particles that were captured and identified: Ascospores*, Basidiospores, Alternaria, Cladosporium, Nigrospora, Aspergillus/Penicillium*, Smuts/Myxomycetes/Periconia/Rusts, Fusarium, Curvularia, Cercospora, Bipolaris/Drechlera, Pestalotiopsis, Pithomyces, Ganoderma, Pollen (non-fungal). Approximate particle sizes for top spore types were: *≤200 µm, ≤20 µm, *≤10 µm.

The number N and varieties V of spores captured increased only modestly from an average of N=7 to N=10 and from V=4 to V=6 for the 821-X acrylic OCA as the acrylic coating thickness was increased from 2 mils to 4 mils. Notwithstanding that modest increase, when a lower storage modulus (softer) OCA acrylic coating was used that was also considerably thicker, then both N and V greatly increased. Thus, when the 8148-X adhesive was used in place of 821-X and its thickness was increased from 1 mil to 6 mils, the N value increased from 8 spores to 54 spores and V increased from 5 varieties to 15 varieties. Thus, the 8148-6 adhesive was capable of capturing more total airborne spores and more spore types than any of the other acrylic adhesive samples evaluated when used in the Zefon Air-O-Cell™ cassette, and more than the original proprietary Zefon spore-capturing material in the commercial cassette.

TABLE 1

| ADHESIVE VALIDATION FOR SPORE TRAP CASSETTES OUTDOOR AIR DATA | | | | |
|---|---|---|---|---|
| TOTAL SPORE COUNTS (RAW COUNTS) | | | | |
| CONTROL (gel) Zefon International | ADHESIVE 1 821X 2 mil | ADHESIVE 2 821X 4 mil | ADHESIVE 3 CEF28XX (8148X) 1 mil | ADHESIVE 4 CEF28XX (8148X) 6 mil |
| 52 | 10 | 12 | 1 | 73 |
| 63 | 10 | 7 | 3 | 68 |
| 43 | 7 | 6 | 3 | 56 |
| 63 | 7 | 2 | 13 | 47 |
| 25 | 2 | 1 | 15 | 79 |
| 37 | 0 | 1 | 2 | 53 |
| 40 | 17 | 6 | 1 | 78 |
| 39 | 3 | 6 | 9 | 75 |
| 50 | 5 | 0 | 1 | 52 |
| 45 | 11 | 15 | 15 | 40 |
|  | 3 | 11 | 2 | 52 |
|  | 8 | 24 | 2 | 39 |
|  | 6 | 10 | 15 | 47 |
|  | 7 | 8 | 15 | 46 |
|  | 11 | 29 | 11 | 38 |
|  | 1 | 16 | 5 | 36 |
|  | 16 | 28 | 11 | 56 |
|  | 3 | 0 | 13 | 40 |

TABLE 1-continued

ADHESIVE VALIDATION FOR SPORE TRAP CASSETTES
OUTDOOR AIR DATA

| | | | | |
|---|---|---|---|---|
| | 0 | 0 | 5 | 44 |
| | 7 | 11 | 9 | 65 |
| x̄ = 46 | x̄ = 7 | x̄ = 10 | x̄ = 8 | x̄ = 54 |

Taxonomic ID Ranking (top 3 spore types)

| | | | | |
|---|---|---|---|---|
| 1. Cladosporium | 1. Smuts/ | 1. Ascospores | 1. Ascospores | 1. Cladosporium |
| 2. Aspergillus/ | Myxomycetes/ | 2. Cladosporium | 2. Basidiospores | <20 μm |
| Penicillium | Periconia | 3. Aspergillus/ | 3. Cladosporium | 2. Ascospores |
| 3. Ascospores | 2. Aspergillus/ | Penicillium | | 3 μm-200 μm |
| | Penicillium | | | 3. Aspergillus/ |
| | 3. Cladosporium | | | Penicillium |
| | | | | <10 μm |

Total Types of spores identified

| | | | | |
|---|---|---|---|---|
| 8 | 4 | 6 | 5 | 15 |

Spores size range

| | | | | |
|---|---|---|---|---|
| 2 μm-200 μm | 2 μm-200 μm | 2 μm-200 μm | 2 μm-200 μm | 2 μm-200 μm |

Example 2. Preparation of Spore Trap Adhesive Assemblies

Figure 2A:
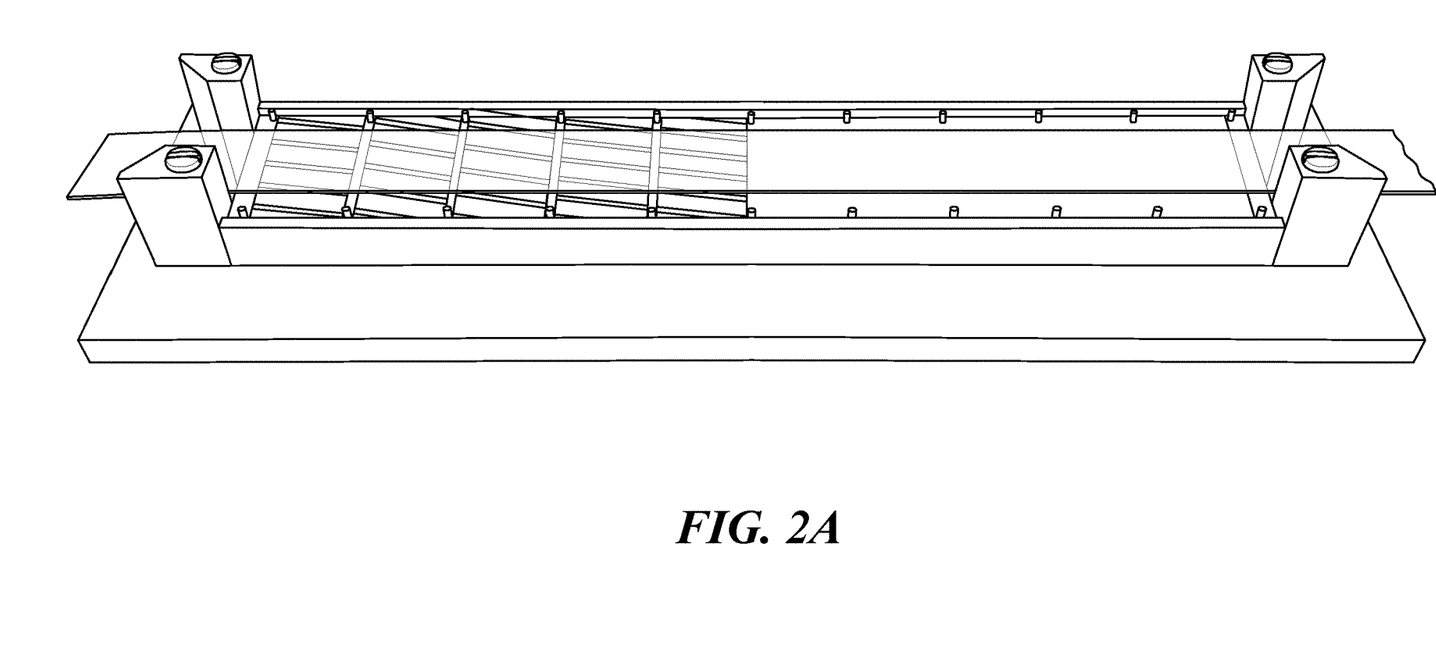
FIG. 2A shows a mounting jig for attaching an adhesive strip to ten microscope coverslips that are removably arranged in a row in a flat shallow channel and separated from one another by spacer pins.
Figure 2B:
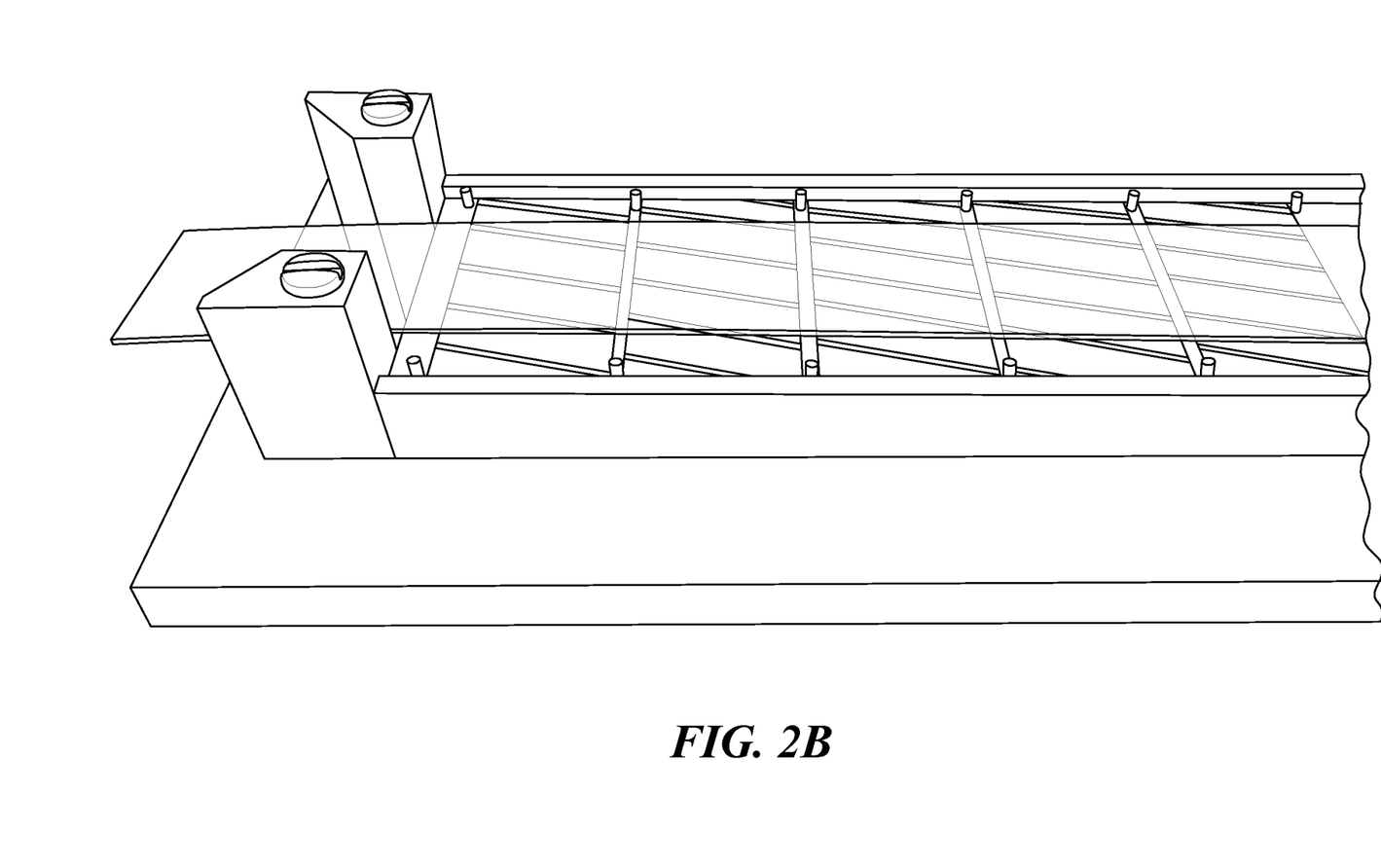
FIG. 2B shows a close-up view of the mounting jig shown in FIG. 2A.
Figure 3:
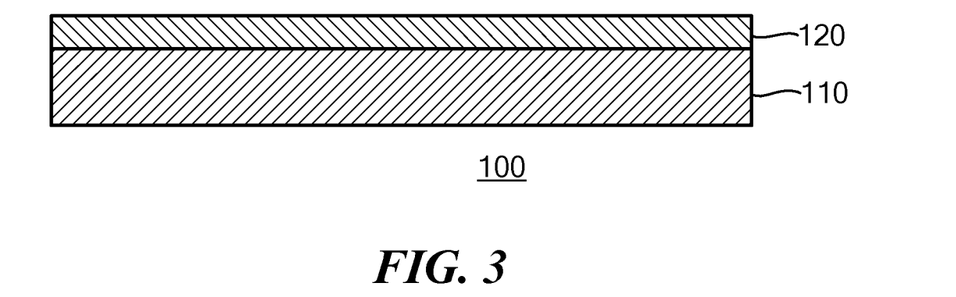
FIG. 3 shows adhesive assembly 100, having substrate 110 upon which is deposited a layer of adhesive material 120.

A mounting jig for holding ten microscope coverslips (each coverslip measuring 17.5 mm wide x 31.0 mm long x 0.4 mm thick) and coating them with adhesive films was prepared. To use the jig, the coverslips were laid flat, side-by-side, and arranged in a row within a flat shallow trough, and were separated from one another near their corners by approximately 1 mm using vertically placed short 1 mm diameter stainless steel pins (see FIG. 2). After the ten coverslips were arranged flat in a row, one of the two peelable release liners was removed from a 25 cm long strip of the adhesive coating (2 cm wide x 25 cm long adhesive strip). The exposed adhesive strip was lowered and bonded onto the above-described row of coverslips. Once bonded, the full row of coverslips was removed from the mounting jig, and a razor blade was used to cut and separate the individual adhesive-coated coverslip assemblies from one another. The second adhesive coating surface (the upper surface not bonded to the coverslip) still remained protected by the second release liner. Before inserting and mounting the adhesive assembly inside the FASC device, the second release liner was removed, exposing the second adhesive coating surface that functions to capture airborne particles when air is propelled through the FASC.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

What is claimed is:

1. An airborne particle collection assembly for use in a forced air sampling cassette, the assembly comprising a transparent substrate coated in whole or in part with a layer comprising a transparent acrylic adhesive material, wherein the layer comprising an adhesive material has a thickness of at least about 125 microns and a storage modulus at 20° C. of less than 200,000 Pascals, and is optically flat and requires essentially no refocusing during scanning and particle identification at 100x to 400x magnification.

2. The assembly of claim 1, wherein the layer comprising an adhesive material has a storage modulus at 20° C. in the range from about 50,000 Pascals to about 150,000 Pascals.

3. The assembly of claim 1, wherein the layer comprising an adhesive material has a thickness of at least about 150 microns.

4. The assembly of claim 1, wherein the layer comprising an adhesive material consists essentially of said adhesive material.

5. The assembly of claim 1, wherein the layer comprising an adhesive material, when used in an airborne particle collection assembly, allows capture of impacting airborne particles throughout full thickness of the layer.

6. The assembly of claim 1, wherein the layer comprising an adhesive material, when used in an airborne particle collection assembly, allows capture of airborne particles having a size in the range from about 2 microns to about 300 microns.

7. The assembly of claim 1, wherein the layer comprising an adhesive material has a thickness in the range from about 125 microns to about 250 microns.

8. The assembly of claim 7, wherein the layer comprising an adhesive material has a thickness in the range from about 125 microns to about 150 microns.

9. The assembly of claim 1, wherein the assembly is contained within a hermetically sealed forced air sampling cassette and has a shelf life of at least two years.

10. The assembly of claim 1, wherein the layer comprising an adhesive material is uniform in composition throughout its thickness.

11. The assembly of claim 1, wherein the refractive index of the layer comprising an adhesive material and the refractive index of the substrate are matched to within 0.1 over a wavelength range of 400-650 nm.

12. The assembly of claim 1, wherein the adhesive material is a pressure-sensitive adhesive selected from the group consisting of uncured acrylic adhesive polymer materials and cured cross-linked acrylic adhesive polymer materials.

13. A method of sampling airborne particles, the method comprising:
 (a) providing the airborne particle collection assembly of claim 1 and a forced air sampling cassette capable of use with the airborne particle collection assembly;

(b) flowing air or gas suspected of containing said airborne particles through the sampling cassette; and (c) analyzing particles captured on the adhesive film.

14. The method of claim 13, wherein in step (c) the captured particles are quantified and/or identified.

15. The method of claim 13, wherein the particles are selected from the group consisting of mold spores, pollen grains, dust particles, allergen particles, mineral dust, asbestos fibers, pet dander, food particles, and nanoparticles.

16. The method of claim 13, further comprising:

(b1) adding a stain to the adhesive film prior to analyzing the particles.

17. The method of claim 13, wherein the particles are analyzed by light microscopy.

18. The method of claim 13, further comprising:

(d) harvesting trapped particles comprising particles of biological origin from the adhesive film and analyzing the particles by applying a diagnostic assay.

19. The method of claim 18, wherein the diagnostic assay comprises nucleic acid sequencing, protein identification, performing an enzyme reaction, or performing a chemical reaction on the harvested particles.

20. The method of claim 13, wherein step (b) is performed in outer space or in an extraterrestrial environment.

21. A method of making a plurality of airborne particle collection assemblies, the method comprising the steps of (a) providing (i) a mounting jig configured to hold a plurality of transparent substrates in a co-planar row, wherein adjacent substrates are spaced apart by spacers and (ii) a strip of transparent acrylic adhesive film sandwiched between two release liners;

(b) placing a plurality of said substrates and spacers into the jig to form a co-planar aligned row of the substrates, wherein adjacent substrates are separated by the spacers;

(c) removing a first release liner from the strip to expose a first surface of the film, (d) contacting the exposed surface of the film with an upper surface of the aligned row of substrates to form an adhesively linked row of substrates;

(e) separating individual adhesively linked substrates from one another using a cutting instrument, thereby forming the plurality of assemblies;

wherein the adhesive film has a thickness of at least 125 microns and a storage modulus at 20° C. of less than 200,000 Pascals, and is optically flat and requires essentially no refocusing during scanning and particle identification at 100× to 400× magnification.

22. The method of claim 21, wherein at least five substrates are positioned in said row.

23. The method of claim 21, wherein at least ten substrates are positioned in said row.

24. The method of claim 21, wherein said spacers are vertical pins positioned in proximity to both side edges of the channel.

25. The method of claim 21, wherein adjacent substrates are separated from one another by at least 0.5 mm.

* * * * *